Patented Aug. 7, 1934

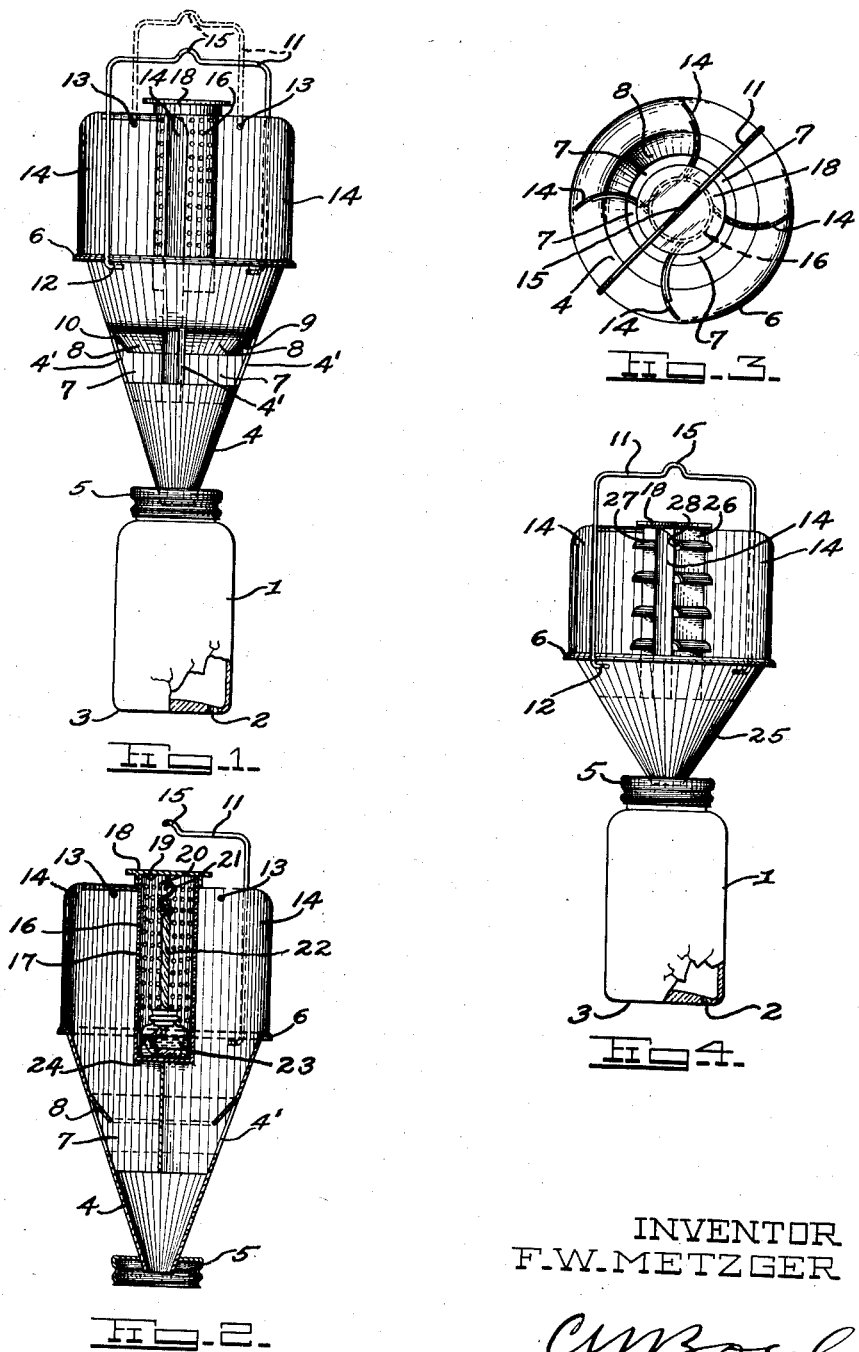

1,968,954

UNITED STATES PATENT OFFICE 1,968,954

INSECT TRAP

Frederick W. Metzger, Moorestown, N. J., dedicated to the free use of the Public of the United States of America Application April 25, 1934, Serial No. 722,328

4 Claims. (Cl. 43—107)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public in the territory of the United States of America to take effect upon the granting of a patent to me.

The invention relates to insect traps and more particularly the Japanese beetle, although insects of many other species have been and may be captured and destroyed.

In trapping the Japanese beetle, particularly, the attractants necessary to draw this insect to the trap induce, to the said trap, many individuals which are not captured, and there is no existing device which thus captures all beetles thus attracted. Beetles attracted, but not caught, increase the infestation in the vicinity of a trap so that a device with a low efficiency in respect to capturing the attracted beetles is of little value.

The object of my trap and the improvements thereof is to provide an inexpensive and efficient device into which a large percentage of the beetles or other insects attracted will pass, and will be prevented from leaving.

The means of ingress in traps of this nature is usually provided in a funnel or conduit whereby attracted insects upon striking its interior, or projections therefrom, are precipitated by gravity into a receptacle from which they cannot escape. It is highly desirable to attract the insects directly to this funnel or to cause them to strike the baffle projecting upward therefrom whereupon they are precipitated into the receptacle. I have found it to be a decided advantage to provide curved baffle plates so that the insects will be diverted toward the center of the device rather than the outer edges. Upon being attracted to a device of this nature insects seek to obtain a foothold on the various surfaces. It is, therefore, essential that such opportunity should be reduced to a minimum. The funnel or conduit leading to the receptacle cannot be of too great a length, otherwise the insects will take wing before being precipitated into the receptacle.

Attracted insects, particularly the Japanese beetle, show a pronounced tendency to strike traps at some distance below the funnel when the bait is located below the mouth of the member. It is thus desirable that the bait or attractants for the Japanese beetle or other insects be located above the funnel.

A further desirable feature is that the non-effective area be made as small as possible in order that a greater number of the insects attracted will fly directly to those portions of the trap whereby they may be captured. An additional feature of my improved device reduces this non-effective area still further by providing apertures in the funnel or conduit whereby Japanese beetles or other insects which seek entrance through this member may have an opportunity to so enter.

Several methods have been developed whereby the attractants may be volatilized to draw insects to the trap, but preferred means are those which dispense the vapors from the attractants in liquid or cake form. To this end a container is provided whereby various types of bait may be used interchangeably according to the desire of the operator.

Still another advantage of my device is the elimination of additional items in construction such as special drainage and ventilation outlets. This simplicity is further characterized by the union of all the elements with the exception of the bait container top into a single unit.

The inclusion of these unique features renders the production and use of my device comparatively inexpensive as compared with other traps of a similar nature and usefulness.

With these and other objects in view I now give a detailed description of the various features of construction which I have proved, by actual test, are capable of accomplishing the result desired and which are illustrated in the drawing wherein I have shown my invention in two different types of traps.

In the drawing Fig. 1 is a side elevation of the trap; Fig. 2 is a view showing the bait container associated with the curved baffle plates; Fig. 3 is a top plan view of the trap; and Fig. 4 is a view of the trap in a modified form.

In describing my invention I first refer to Figs. 1 and 2 wherein is shown a beetle or insect container 1 consisting of an ordinary jar of the "Mason" type although any suitable container equipped with a screw top 5 may be employed. This container 1 has a perforation or perforations 2 in the bottom 3 so that liquids flowing through the tapered funnel or conduit 4 may pass readily through the container. As a conduit for the passage of the beetles or insects into the container 1 there is provided a tapered funnel 4, the smaller end of which extends into the top of the beetle container 1 through an appropriate opening in the flat surface of the screw top 5. This opening is sufficiently large so that when the spreading walls of the funnel or conduit 4 come in contact with the edges of the opening in the screw top 5, the smaller opening of the tapering funnel 4 extends into the upper portion of the container 1 and provides an entrance into the container. The funnel or conduit is rigidly attached to the screw top, which is internally screwthreaded as illustrated, by which it is enabled to engage the external screw threads of the upper end of the insect container and to which it is so attached when in use. The rim 6 at the larger end of the funnel 4 is curled slightly in the manner illustrated to afford as little space as possible for attracted insects to crawl about the rim, so that individuals attempting to alight thereon will be precipitated into the container.

In the walls of the funnel 4 there are four apertures 7 positioned between the points of contact of the walls of the funnel and the baffle plates 14 hereinafter referred to, and these apertures may be of a preferred size and shape. As utilized by me, the apertures 7 are narrower at the bottom than at the top, widening at the top to conform in shape with the funnel 4. I form these apertures by cutting through the funnel walls on the bottom and two sides of the apertures. The resulting flaps attached to the funnel at the top of the apertures are partly cut off so that when bent inwardly they will not extend too far into the funnel, leaving the flaps 8, which as used by me are approximately 1 to 1½ inches long, although this length may vary somewhat. The flaps 8 are bent inwardly so as to form a downwardly sloping surface within the funnel or conduit adjacent to the side walls of the conduit. These flaps 8 should be cut at their side edges to fit as closely as possible to the sides of the baffle plates as shown at 9 and 10, and should extend only a short distance into the funnel, leaving uninterrupted downward passageways through the funnel between the inner edges of the flaps and the sides of the baffle plates. It is essential that the flaps 8 fit snugly at these two points so that beetles will have no opportunity of obtaining a foothold in any cracks between the joints. The length of the flap 8 and the angle it is bent inward from the wall of the funnel 4 are adjusted so that beetles entering the trap above the mouth of the funnel cannot fly out or fall through the apertures below, there being an uninterrupted conduit from the top of the funnel to its bottom. The apertures or openings 7 are of such a nature that they can be stamped out during the same operation as the funnel. In cutting the funnel material a narrow strip 4' of the funnel wall may separate the apertures 7 from each other, these strips being in contact with the outer edges of the baffle plates. However, these strips may of course be eliminated leaving the funnel in two sections which in that case are held in proper relation to each other by being soldered to the outer edges of the baffle plates.

The bail 11 is inserted through apertures 12 on opposite sides of the funnel 4 or alternatively through apertures 13 in the baffle 14. Said bail is equipped with a loop 15 in the center of its upper horizontal surface which provides a convenient means of keeping the device on level plane when suspended from a standard inserted in the ground and said trap should be so suspended in order to operate in a satisfactory manner.

The 4-winged baffle 14 is attached to the funnel 4 and extends downward into the funnel 4 for approximately one-half of its length to the bottom of the apertures 7 and upward from the rim of the funnel for the other half of said length which is a preferred position.

The plates of the baffle 14 are formed in the shape of a cross to divide the upper portion of the funnel or conduit into separate passages through which the beetles drop when they come in contact with the baffle plates.

The plates of the baffle 14 do not extend upwards for a greater distance because beetles striking said baffle at too great a height from the beetle receptacle are able to take wing before entering said receptacle through the funnel or conduit. It is a preferred construction that the wings of the baffle also project into said funnel or conduit to the bottom of or slightly below the apertures 7 so that insects entering the funnel through one may not have an opportunity to fly out through another opposite or adjacent to the one through which entrance was effected.

The edges of the baffle 14 are rolled to prevent insects which are attracted from obtaining a foothold with the result that some will escape capture.

The wings of the baffle 14 do not run in a straight line from the bait container 16 to the outer rim of the funnel 4, but said wings are curved in such a manner as will tend to deflect insects striking them toward the center of the device or the bait container 16. This is a preferred type of construction because many insects which strike a baffle with a flat surface are precipitated by the impact beyond the edge of the funnel and are consequently lost.

The bait container 16 is preferably constructed of perforated metal plate for five-sixths of its length and of solid metal plate for the remainder, said length being three-fourths the length of the baffle 14, starting at the top of the baffle plates. The perforation permits volatilization of the attractive vapors while the solid bottom and lower portion prevents any of the attractive materials from dripping into the funnel 4. Said bait container is located intermediate the four wings of the baffle 14 as shown in the drawing, being soldered or otherwise attached thereto by the angular sections 17 of the baffle 14. The bait container 16 is surmounted by a flat removable cover 18 which projects laterally beyond said container to afford protection from rain. Said cover 18 serves an additional purpose when bait dispensed by a wick is employed in the container 16, being equipped on its lower surface 19 with a metallic loop 20 to engage a hook 21 attached to the wick 22 in the manner illustrated. The said container 16 is of preferred size and shape so that the proper quantity of the attractive branbase bait for efficient operation may be placed in a bottle or other suitable receptacle of convenient size 23 resting on the bottom 24 of the bait container 16 and be dispensed by the said wick 22, considerable vertical space being provided for the exposure of said wick. If, however, it is desired to employ a cake-type of bait or impregnate the attractants on such materials as plaster Paris or pumice, said container is also of preferred size for the use of said bait.

In Fig. 4 of the drawing I have illustrated my invention in a slightly different type of trap. In this device the parts 1–6 (except 4) and 11–14, inclusive, are identical with the parts correspondingly numbered in Fig. 1 of the drawing. One departure from the device as shown in Fig. 1 is that the funnel 25 is of a length equal to the length of the baffle 14 projecting above said funnel 25, which is a preferred type of construction in that it reduces the non-effective section of the funnel to an area smaller than that section of the trap whereby beetles can be captured. This feature further reduces the cost of construction. The bait container 26 is mounted in the baffle 14 in a manner similar to the device previously described. Said container 26 is, however, of somewhat different construction than the heretofore mentioned structure 16, being equipped with several downwardly projecting flaps 27 formed by cutting the walls of the container 26 to allow the escape of attractive vapors through the apertures 28. This container 26 affords more protection to the bait than does the container 16, but the latter may be employed without prejudice. Said container 26 is also of a preferred size and shape which permits the use of bait in several forms.

It will be readily understood that my device may be constructed so that funnel 4 may be used with said container 26 and said funnel 25 with said container 16.

Having fully disclosed my discovery, I claim:

1. An insect trap, comprising an insect container, a downwardly tapered conduit one end of which extends vertically into the upper portion of said insect container and the other end of which projects vertically above the insect container, the walls of said conduit having insect entrance apertures, and downwardly sloping deflecting flaps over the apertures within the conduit, a baffle having outwardly curved cross-baffle plates projecting upwardly from the conduit for diverting insects into the conduit, and downwardly into the conduit to a point below said apertures, a bait container positioned intermediate the curved plates of the baffle and extending from the top of the baffle plates to a point below the top of the conduit and having a plurality of openings in its walls, means to protect the interior of the bait container from rain, a bait vapor dispenser means adapted to the use of dry and liquid bait and means to suspend the insect trap from any convenient source of support.

2. An insect trap comprising an insect container, a downwardly tapering conduit projecting vertically from the container, the walls of said conduit having insect entrance apertures and downwardly sloping deflecting flaps over the apertures within the conduit, a baffle projecting vertically from and above said conduit comprising a central tubular section extending from the top of the baffle to a point below the top of the conduit, closed at its lower end and having perforations in its wall, and outwardly curved baffle plates radially and rigidly secured to the wall of the tubular section and extending from the top of the tubular section to a point below said apertures, and a removable cover having a loop centrally secured to its under surface and extending laterally beyond the tubular section to protect its perforated wall from rain, a liquid bait receptacle positioned in the bottom of the tubular section, a wick suspended from the loop in the cover and passing through the tubular section into the bait receptacle.

3. In an insect trap having an insect container, a downwardly tapered conduit the lower end of which extends vertically into the container and the other end of which extends vertically above the container, the walls of said conduit having insect entrance apertures and downwardly sloping deflecting flaps extending inwardly over said apertures, a baffle projecting vertically from and above the conduit comprising a central tubular section closed at its lower end with a removable cover at its upper end and having perforations in its walls and horizontally curved baffle plates radially and rigidly secured to the walls of the tubular section, the baffle extending into the conduit to a point below said apertures and the central tubular section extending from the top of the baffle plates to a point below the top of the conduit.

4. In an insect trap having an insect container and a baffle above the container, a downwardly tapered conduit projecting upwardly from the container and from the upper end of which there projects the baffle, the walls of said conduit having insect entrance apertures above the lower end of the baffle and downwardly sloping deflecting flaps extending inwardly over said apertures.

FREDERICK W. METZGER.